US009096087B2

(12) United States Patent
Meados et al.

(10) Patent No.: US 9,096,087 B2
(45) Date of Patent: Aug. 4, 2015

(54) DETECTION OF AN EVENT SIGNAL AND A HEARTBEAT SIGNAL PROVIDED ALONG A SIGNAL PATH

(71) Applicant: HEWLETT-PACKARD COMPANY, Fort Collins, CO (US)

(72) Inventors: David Bradley Meados, Albany, OR (US); Bruce A Stephens, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 121 days.

(21) Appl. No.: 13/627,834

(22) Filed: Sep. 26, 2012

(65) Prior Publication Data

US 2014/0085646 A1 Mar. 27, 2014

(51) Int. Cl.

*G06F 3/12* (2006.01)
*G06F 15/00* (2006.01)
*G06K 15/12* (2006.01)
*H04N 1/00* (2006.01)
*B41J 25/304* (2006.01)

(52) U.S. Cl.

CPC ..................................... *B41J 25/304* (2013.01)

(58) Field of Classification Search

USPC ......... 358/1.15; 600/484, 513, 508, 586, 500, 600/529; 607/14, 17, 18, 23

See application file for complete search history.

(56) References Cited

U.S. PATENT DOCUMENTS 4,679,570 A * 7/1987 Lund et al. .................... 600/528
4,930,518 A * 6/1990 Hrushesky .................... 600/484
5,936,520 A 8/1999 Luitje et al.
5,997,482 A * 12/1999 Vaschillo et al. ............. 600/484
7,343,199 B2 * 3/2008 Hatlestad et al. ............. 600/513
7,366,569 B2 * 4/2008 Belalcazar ....................... 607/23
8,046,069 B2 * 10/2011 Kramer et al. .................. 607/23

(Continued)

FOREIGN PATENT DOCUMENTS

WO WO-2011057904 A1 5/2011

OTHER PUBLICATIONS

Cypress Semiconductor Corporation—"Failsafe 2.5 V/3.3 V Zero Delay Buffer"—Document No. 38-07304—revised Aug. 12, 2011~pp. 1-14.

(Continued)

*Primary Examiner* — Akwasi M Sarpong

(74) *Attorney, Agent, or Firm* — Hewlett-Packard Patent Department

(57) ABSTRACT

An image forming system includes a substrate transport unit, an image forming module, an event sensing module, a heartbeat generation module, a signal detection module, and a repositioning module. The substrate transport unit may transport substrate including at least one splice along a transport path. The image forming module may form an image on the substrate. The event sensing module may detect an event and provide an event signal along a signal path in response to the event. The heartbeat generation module may provide a heartbeat signal different than the event signal along the signal path. The signal detection module may determine a presence of the event signal and an absence of the heartbeat signal. The repositioning module may move the image forming module from a first position to a second position in response to a determination of the presence of the event signal.

13 Claims, 7 Drawing Sheets

(56) References Cited

U.S. PATENT DOCUMENTS

| | | | | |
|---|---|---|---|---|
| 8,423,142 | B2 * | 4/2013 | Freeberg | 607/42 |
| 2006/0012586 | A1 * | 1/2006 | Ochs et al. | 345/204 |
| 2009/0216080 | A1 | 8/2009 | Nakamura | |
| 2012/0140007 | A1 * | 6/2012 | Pawlik et al. | 347/102 |

OTHER PUBLICATIONS

Leyva, Phill—"Fail-Safe, Low-Speed, Variable-Reluctance Sensors"—Application Note 1076—Maxim Integrated Products—May 24, 2002—pp. 1-4.

* cited by examiner

TIME

DETECTION OF AN EVENT SIGNAL AND A HEARTBEAT SIGNAL PROVIDED ALONG A SIGNAL PATH

BACKGROUND

Image forming systems may include print heads, and the like, to form images on a substrate. The image forming systems may also include event detection modules such as sensors to detect respective events of interest.

BRIEF DESCRIPTION OF THE DRAWINGS

Non-limiting examples are described in the following description, read with reference to the figures attached hereto and do not limit the scope of the claims. Dimensions of components and features illustrated in the figures are chosen primarily for convenience and clarity of presentation and are not necessarily to scale. Referring to the attached figures:

DETAILED DESCRIPTION

Image forming systems such as high speed commercial inkjet print presses may include print heads, and the like, to form images on a substrate. The image forming systems may also include event detection modules such as sensors to detect respective events of interest. On occasion, however, the event detection modules and/or its communication path to provide event notification may fail. Thus, the image forming system may not be able to effectively determine whether event notification is properly connected and functioning therein. For example, in a cabled interconnect arrangement, a single point failure such as a single wire fault in a cable, a missing sensor, or a malfunctioning sensor may disconnect a signal path thereof without a malfunction being indicated. Accordingly, an event may occur and not be properly communicated resulting in a lack of an appropriate response to the event. Consequently, the image forming system may be damaged, and the like.

In examples, an image forming system includes a substrate transport unit, an image forming module, an event sensing module, a heartbeat generation module, a signal detection module, and a repositioning module. The substrate transport unit may transport substrate including at least one splice along a transport path. The image forming module may form an image on the substrate. The event sensing module may detect an event and provide an event signal along a signal path in response to the event. The heartbeat generation module may provide a heartbeat signal different than the event signal along the signal path. That is, the heartbeat signal and the event signal may be provided on the same signal such as a single wire. Additionally, a pulse width of the event signal may be longer than a pulse width of the heartbeat signal. The signal detection module may determine a presence of the event signal and an absence of the heartbeat signal. The repositioning module may move the image forming module from a first position to a second position in response to a determination of the presence of the event signal. Thus, a malfunction of event notification may be indicated, for example, due to the heartbeat signal and the event signal share the same signal path, an ability of the signal detection module to distinguish between the respective signals, and the ability of the signal detection module to determine the absence and presence of the respective signals. That is, the image forming system includes a fail-safe to identify when event notification is not functioning as intended. Accordingly, the image forming system may provide an alert to a user, shut down, and/or be placed in a safety mode to avoid damage and/or inaccurate event notification.

Figure 1:
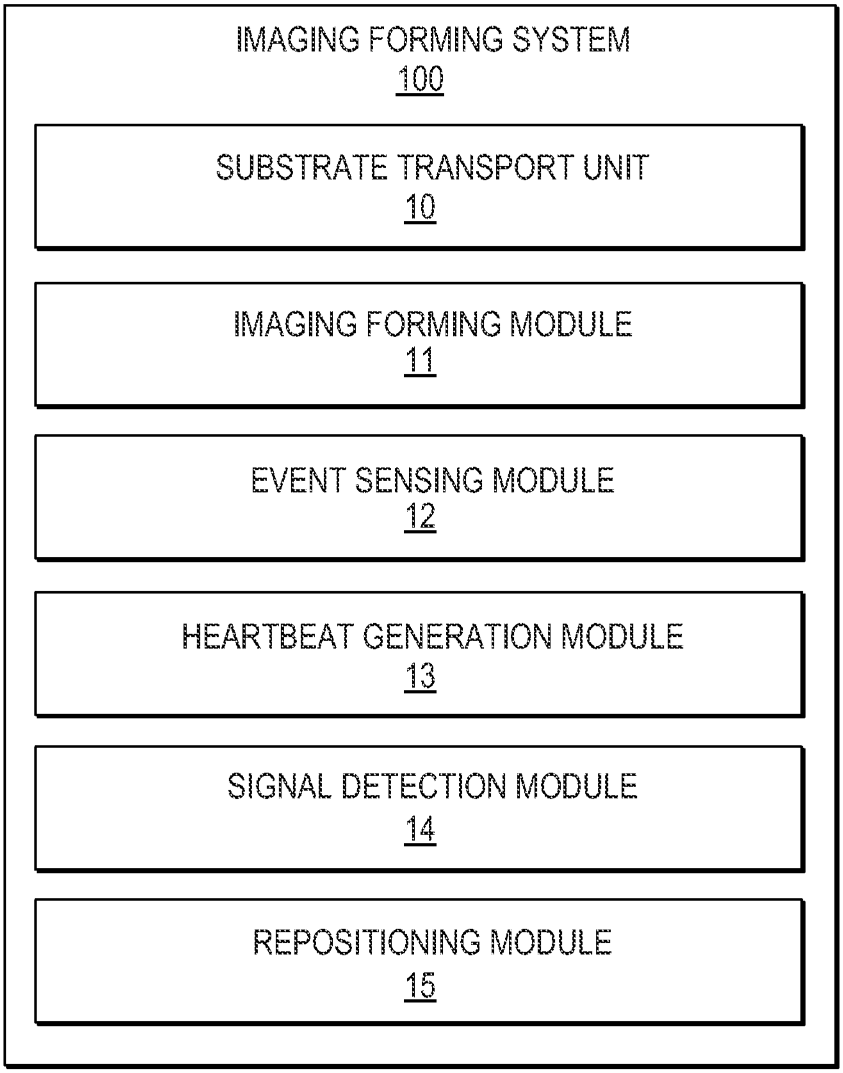
FIG. 1 is a block diagram illustrating an image forming system according to an example.

FIG. 1 is a block diagram illustrating an image forming system according to an example. Referring to FIG. 1, in some examples, an image forming system 100 includes a substrate transport unit 10, an image forming module 11, an event sensing module 12, a heartbeat generation module 13, a signal detection module 14, and a repositioning module 15. The substrate transport unit 10 may transport substrate including at least one splice along a transport path. For example, portions of the substrate may be attached to each other through a splice to form a long and continuous length. For example, the splice may enable separate substrates to be formed into a single substrate through connecting portions of the formerly separate substrates through pressure, heat, and/or adhesives, and the like.

Referring to FIG. 1, in some examples, the image forming module 11 may form an image on the substrate. For example, the image forming module 11 may include a print head, a plurality of print heads, a laser unit, and the like. The event sensing module 12 such as a sensor may detect an event and provide an event signal along a signal path in response to the event. For example, the event may include identification of a splice, and the like. In some examples, the event sensing module 12 may selectively output signals corresponding to an idle state, a detected event state, and a fault state. The idle state may be a state in which the heartbeat signal such as a continuous stream of pulses is being received by the signal detection module 12 and an event is not identified in a normally functioning image forming system 100. The detected event state may be a state in which the event signal such as a single pulse of a predefined duration is being received by the signal detection module 14 in a normally functioning image forming system 100. The fault state may be a state in which the heartbeat signal is not received by the signal detection module.

Referring to FIG. 1, in some examples, the heartbeat generation module 13 may provide a heartbeat signal different than the event signal along the signal path. For example, a pulse width of the event signal may be longer than a pulse width of the heartbeat signal. In some examples, the heartbeat generation module 13 may be configured to provide the heartbeat signal in a continuous manner. The signal detection module 14 may determine a presence of the event signal and an absence of the heartbeat signal. In some examples, the signal detection module 14 may continuously sample and process incoming signals (e.g., pulses) to determine whether a heartbeat signal, an event signal, a superimposed heartbeat and event signal, or a fault condition (e.g., fault signal or no signal) is present.

Referring to FIG. 1, in some examples, the repositioning module 15 may move the image forming module from a first position to a second position in response to a determination of the presence of the event signal. For example, the first position may correspond to an image forming position in which the image forming module 11 selectively forms an image on the substrate. The second position may correspond to a safety position in which the image forming module 11 awaits the passing of the splice thereby. That is, in some examples, upon the identification of a splice 21*a*, the repositioning module 15 may move the image forming module 11 away from the respective splice. Additionally, the repositioning module 15 may return the image forming module 11 to the first position after the respective splice passes by the image forming module 11. The repositioning module 15 may include servos and/or motors, and the like.

Figure 2:
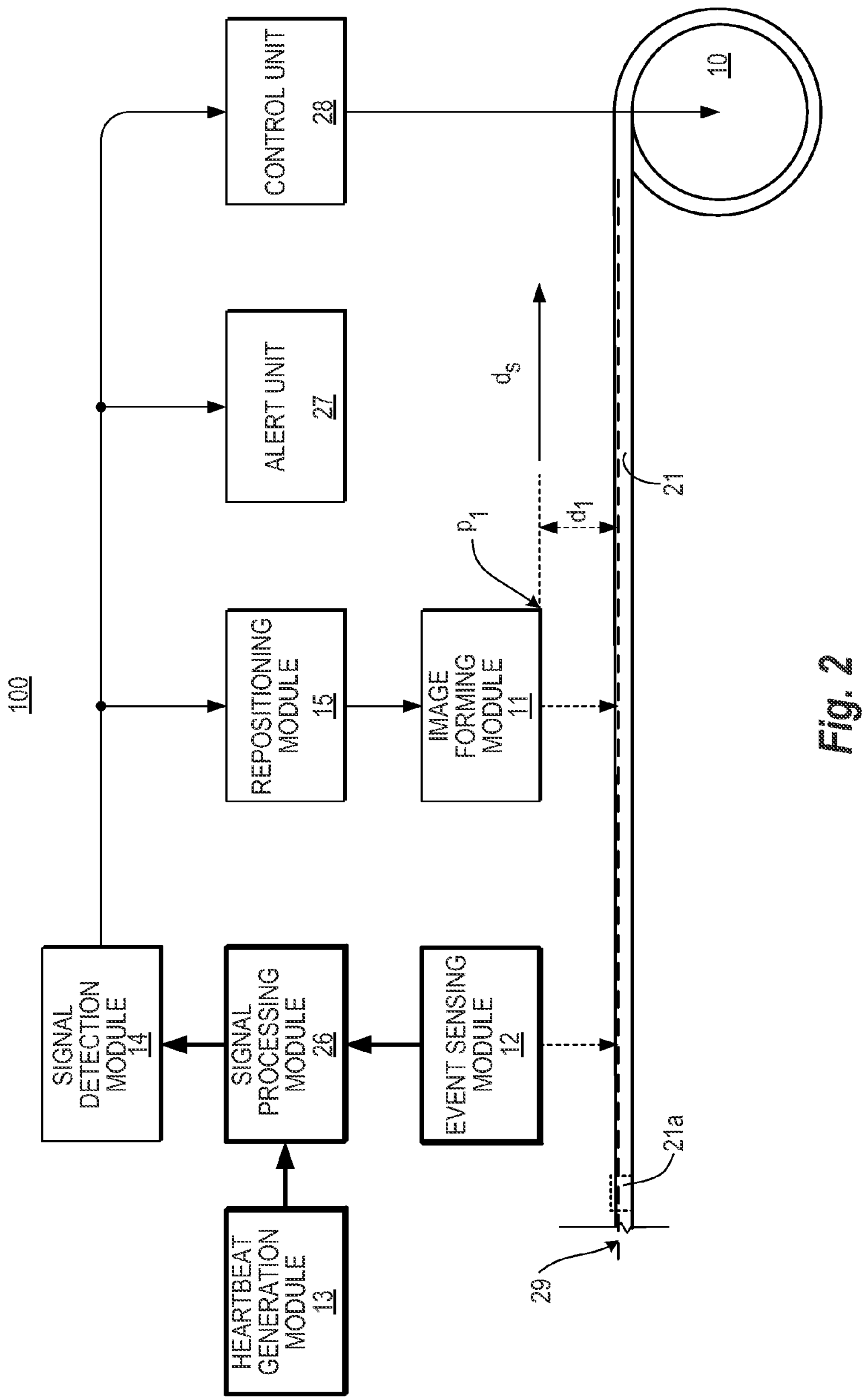
FIG. 2 is a schematic illustrating the image forming system of FIG. 1 including an image forming module in an image forming position according to an example.
Figure 3:
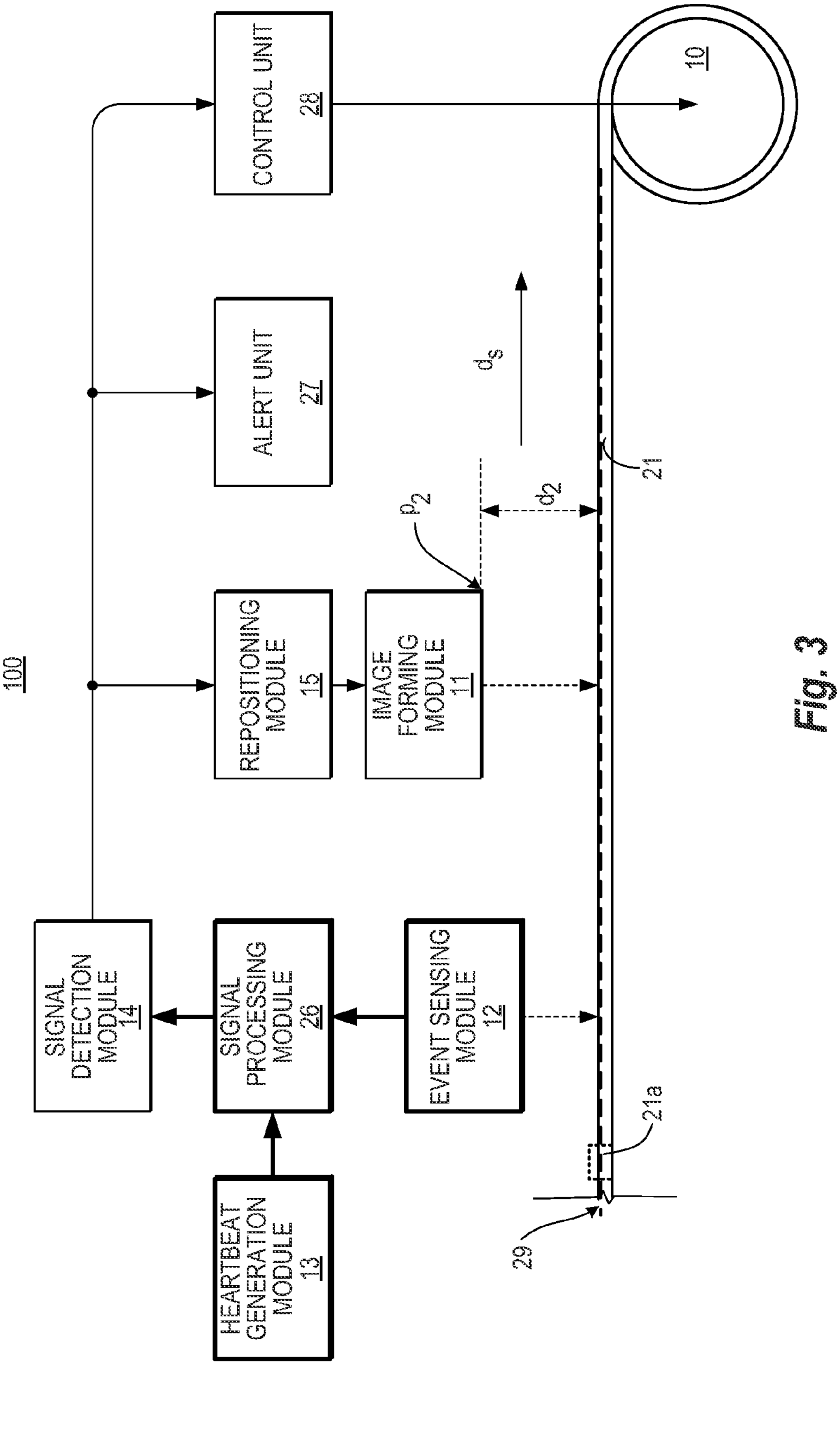
FIG. 3 is a schematic illustrating the image forming system of FIG. 1 including the image forming module in a safety position according to an example.

FIG. 2 is a schematic illustrating the image forming system of FIG. 1 including an image forming module in an image forming position according to an example. FIG. 3 is a schematic illustrating the image forming system of FIG. 1 including the image forming module in a safety position according to an example. Referring to FIGS. 2 and 3, in some examples, an image forming system 100 includes a substrate transport unit 10, an image forming module 11, an event sensing module 12, a heartbeat generation module 13, a signal detection module 14, and a repositioning module 15 as previously described with respect to FIG. 1. The image forming system 100 may also include a signal processing module 26, an alert unit 27, and a control unit 28. The event, for example, may be identification of a splice 21*a* on a substrate 21 to hold portions of the substrate 21 together. The signal processing module 26 may superimpose the heartbeat signal on the event signal, and provide the superimposed heartbeat and event signal to the signal detection module 14. In some examples, the signal processing module 26 may include the heartbeat generation module 13.

Referring to FIGS. 2 and 3, in some examples, the signal processing module 26 may also disable the heartbeat signal from being received by the signal detection module 14 based on a disable event. For example, the disable event may be a single point failure such as a sensor being off, a sensor malfunction, and/or a broken event signal communication path. In some examples, the signal processing module 26 may monitor and detect signals associate with sensors, and the like, including voltage signals and/or currents signals to confirm normal operation. Identification of non-normal operation thereof by the signal processing module 26 may trigger a disable event.

Referring to FIGS. 2 and 3, in some examples, the repositioning module 15 may move the image forming module from a first position $p_1$ (FIG. 2) to a second position $p_2$ (FIG. 3) in response to a determination of the presence of the event signal. For example, the first position $p_1$ may correspond to an image forming position in which the image forming module 11 selectively forms an image on the substrate 21. The second position $p_2$ may correspond to a safety position in which the image forming module 11 awaits the respective splice 21*a* to pass by. That is, in some examples, upon the identification of a splice 21, the repositioning module 15 may move the image forming module 11 away from the respective splice to a safety position to provide adequate margin of clearance so that the splice, and the like, does not unintentionally contact the image forming module 11 and the like. Such unintentional contact may damage the image forming module 11 and/or image forming system 100. Additionally, the repositioning module 15 may return the image forming module 11 to the first position after the respective splice passes by the image forming module 11.

Referring to FIGS. 2 and 3, in some examples, the alert unit 27 may provide at least one of a visual alert and an audio alert to a user in response to a determination of the absence of the heartbeat signal. That is, the alert unit 27 may inform a user of the image forming system 100 that the may be a failure of event notification. The control unit 28 may also decrease a speed of the substrate 21 transported along the transport path 29 in a transport direction $d_s$ in response to the determination of the presence of the event signal. For example, the control unit 28 may communicate with the substrate transport unit 10 to slow down the advancement of the splice 21 in the transport direction $d_s$ so that the image forming module 11 may be moved to the second position $p_2$. The image forming module 11 and the transport path 29 may be spaced apart from each other by a first distance $d_1$ in the first position $p_1$ (FIG. 2) and a second distance $d_2$ in the second position $p_2$ (FIG. 3). The second distance $d_2$ may be greater than the first distance $d_1$.

In some examples, an event sensing module 12, a heartbeat generation module 13, a signal detection module 14, a signal processing module 26, an alert unit 27, and/or a control unit 28 may be implemented in hardware, software including firmware, or combinations thereof. The firmware, for example, may be stored in memory and executed by a suitable instruction-execution system. If implemented in hardware, as in an alternative example, the event sensing module 12, the heartbeat generation module 13, the signal detection module 14, the signal processing module 26, the alert unit 27, and/or the control unit 28 may be implemented with any or a combination of technologies which are well known in the art (for example, discrete-logic circuits, application-specific integrated circuits (ASICs), programmable-gate arrays (PGAs), field-programmable gate arrays (FPGAs), and/or other later developed technologies. In other examples, the event sensing module 12, the heartbeat generation module 13, the signal detection module 14, the signal processing module 26, the alert unit 27, and/or the control unit 28 may be implemented in a combination of software and data executed and stored under the control of a computing device.

Figure 4A:
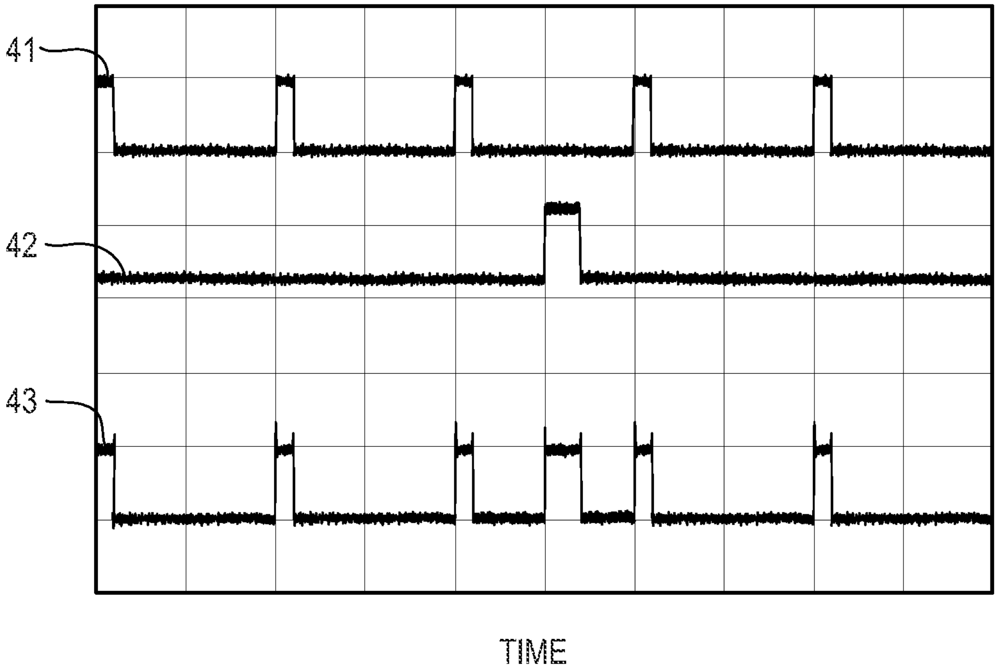
FIGS. 4A and 4B are timing diagrams illustrating signals provided and detected by the image forming system of FIG. 1 according to an example.
Figure 4B:
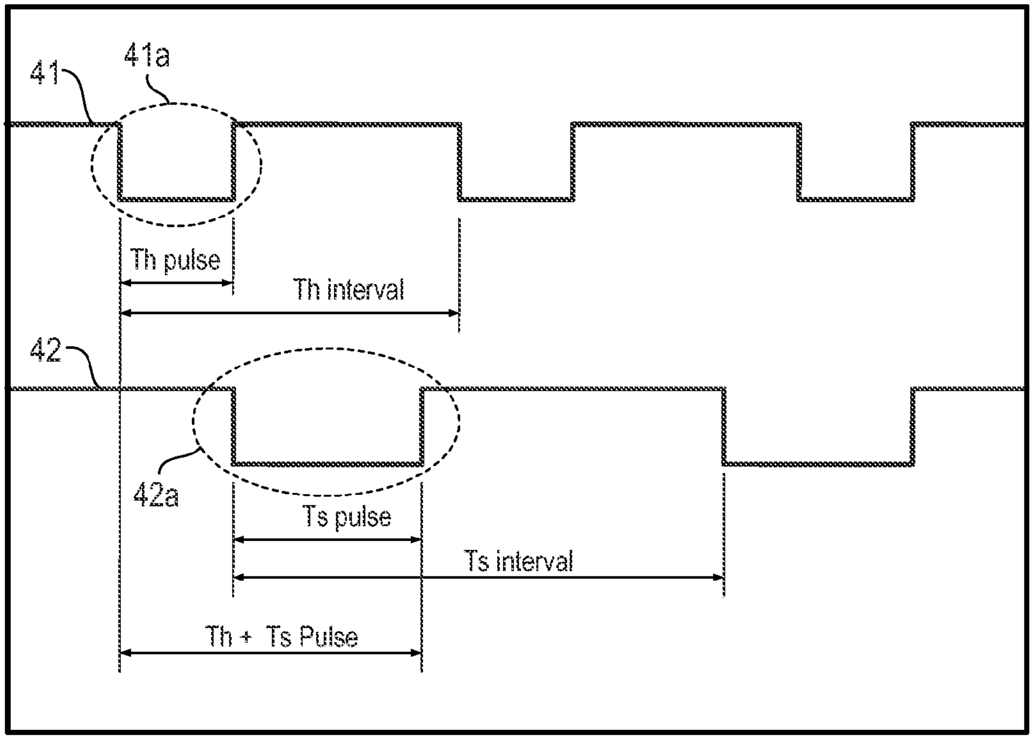

FIGS. 4A and 4B are timing diagrams illustrating signals provided and detected by the image forming system of FIG. 1 according to examples. Referring to FIG. 4A, in some examples, a heartbeat signal 41 provided by the heartbeat generation module 13 may include a continuous stream of pulses of a predefined pulse width $T_h$ and period $T_h$ interval. In some examples, the event signal 42 provided by the event sensing module 12 may include a single pulse of a predefined duration $T_s$. $T_h+T_s$ may correspond to the sum of maximum heartbeat signal and event signal pulse width. As illustrated in FIG. 4B, in some examples, the heartbeat signal 41 may be superimposed on the event signal 42 to form a superimposed heartbeat and event signal 43 by the signal processing module 26, and provided thereby to the signal detection module 14. Additionally, the heartbeat signal 41 may be different than the event signal 42 provided along the signal path. For example, as illustrated in FIG. 4B, a pulse width $T_s$ pulse of the event signal 42 may be longer than a pulse width $T_h$ of the heartbeat signal 41.

Figure 5:
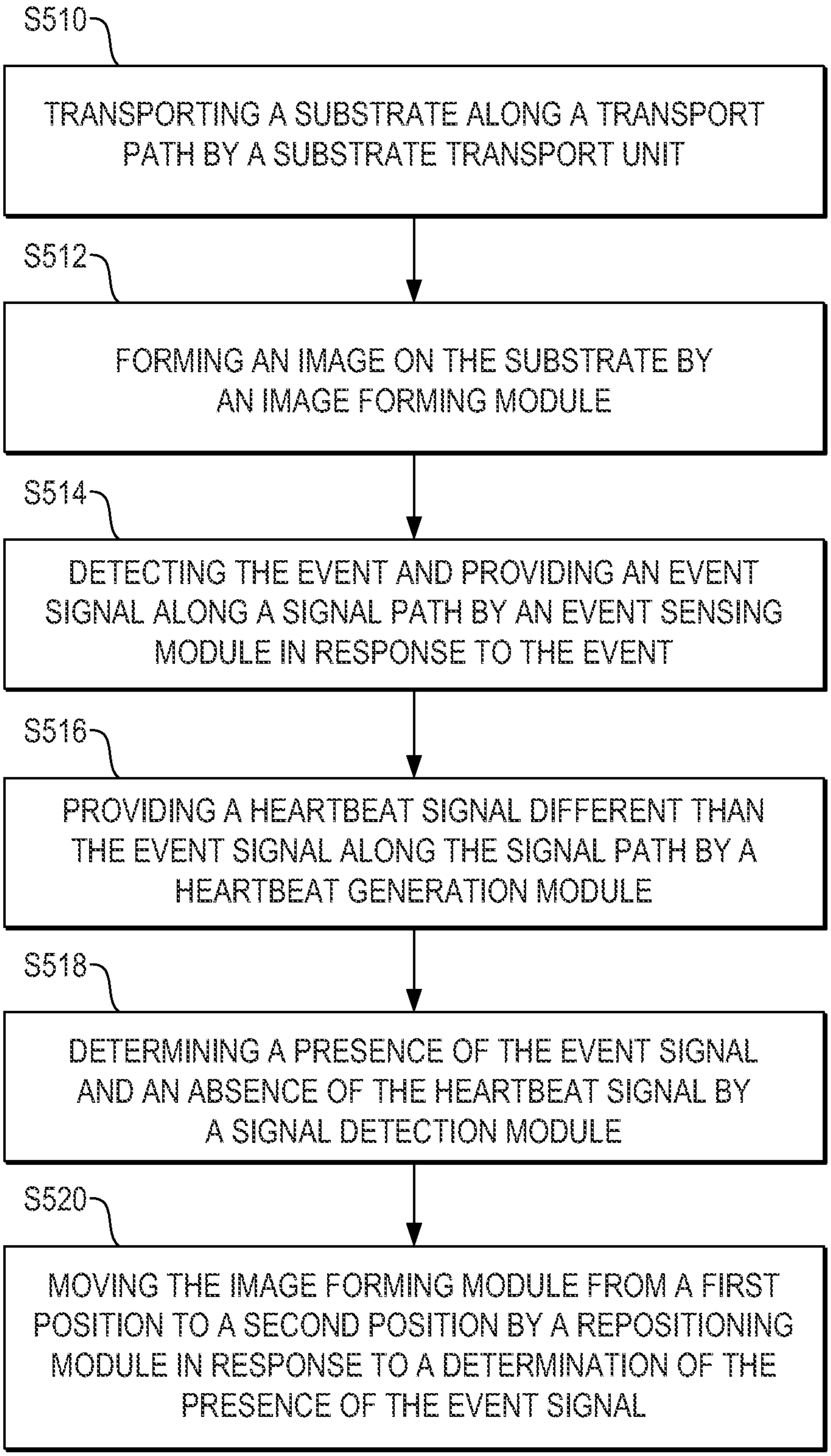
FIG. 5 is a flowchart illustrating a method of detecting an event in an image forming system according to an example.

FIG. 5 is a flowchart illustrating a method of detecting an event in an image forming system according to an example. Referring to FIG. 5, in block S510, a substrate is transported along a transport path by a substrate transport unit. In block S512, an image is formed on the substrate by an image forming module. In block S514, an event is detected and an event signal is provided along a signal path by an event sensing module in response to the event. For example, a respective splice on the substrate may be identified by the event sensing module. Additionally, the event signal may be provided by the event sensing module in response to the identification of the splice.

In block S516, a heartbeat signal different than the event signal is provided along the signal path by a heartbeat generation module. For example, a pulse width of the event signal may be longer than a pulse width of the heartbeat signal. In some examples, the heartbeat signal may be provided in a continuous manner by the heartbeat generation module. In block S518, a presence of the event signal and an absence of the heartbeat signal are detected by a signal detection module. In block S520, the image forming module is moved from a first position to a second position by a repositioning module in response to a determination of the presence of the event signal. In some examples, the image forming module and the transport path may be spaced apart from each other by a first distance in the first position and a second distance in the second position such that the second distance is greater than the first distance.

In some examples, the method may also include decreasing a speed of the substrate transported along the transport path by a control unit in response to the determination of the event signal. In some examples, the method may also include superimposing the heartbeat signal on the event signal by a signal processing module. Additionally, the method may also include providing the superimposed heartbeat signal and the event signal to the signal detection module by the signal processing unit. In some examples, the method may also include disabling the heartbeat signal from being received by the signal detection module by a signal processing module on a disable event. In some examples, the method may also include providing at least one of a visual alert and an audio alert to a user by an alert unit in response to a determination of the absence of the heartbeat signal.

Figure 6:
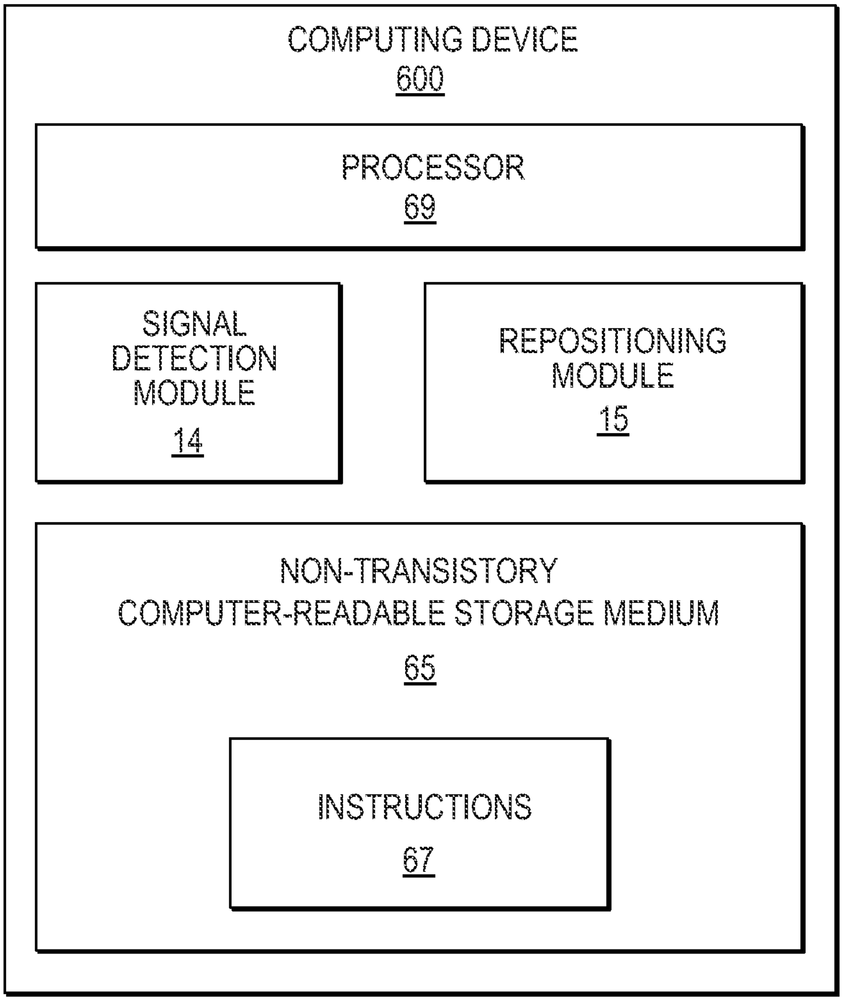
FIG. 6 is a block diagram illustrating a computing device such as an image forming system including a processor and a non-transitory, computer-readable storage medium to store instructions to operate the image forming system to detect an event in an image forming system according to an example.

FIG. 6 is a block diagram illustrating a computing device such as an image forming system and a non-transitory, computer-readable storage medium to store instructions to operate the image forming system to detect an event therein according to an example. Referring to FIG. 6, in some examples, the non-transitory, computer-readable storage medium 65 may be included in a computing device 600 such as an image forming system including a signal detection module 14 and a repositioning module 15. The signal detection module 14 may determine a presence of an event signal and an absence of the heartbeat signal provided on a same signal path. The repositioning module 15 may move an image forming module 11 (FIG. 1) from a first position to a second position in response to a determination of the presence of the event signal. In some examples, the non-transitory, computer-readable storage medium 65 may be implemented in whole or in part as instructions 67 such as computer-implemented instructions stored in the computing device locally or remotely, for example, in a server or a host computing device considered herein to be part of the image forming system.

Referring to FIG. 6, in some examples, the non-transitory, computer-readable storage medium 65 may correspond to a storage device that stores instructions 67, such as computer-implemented instructions and/or programming code, and the like. For example, the non-transitory, computer-readable storage medium 65 may include a non-volatile memory, a volatile memory, and/or a storage device. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM).

Referring to FIG. 6, examples of storage devices include, but are not limited to, hard disk drives, compact disc drives, digital versatile disc drives, optical drives, and flash memory devices. In some examples, the non-transitory, computer-readable storage medium 65 may even be paper or another suitable medium upon which the instructions 67 are printed, as the instructions 67 can be electronically captured, via, for instance, optical scanning of the paper or other medium, then compiled, interpreted or otherwise processed in a single manner, if necessary, and then stored therein. A processor 69 generally retrieves and executes the instructions 67 stored in the non-transitory, computer-readable storage medium 65, for example, to operate a computing device 600 such as the image forming system to detect an event therein in accordance with an example. In an example, the non-transitory, computer-readable storage medium 65 can be accessed by the processor 69.

It is to be understood that the flowchart of FIG. 5 illustrates architecture, functionality, and/or operation of examples of the present disclosure. If embodied in software, each block may represent a module, segment, or portion of code that includes one or more executable instructions to implement the specified logical function(s). If embodied in hardware, each block may represent a circuit or a number of interconnected circuits to implement the specified logical function(s). Although the flowchart of FIG. 5 illustrates a specific order of execution, the order of execution may differ from that which is depicted. For example, the order of execution of two or more blocks may be scrambled relative to the order illustrated. Also, two or more blocks illustrated in succession in FIG. 5 may be executed concurrently or with partial concurrence. All such variations are within the scope of the present disclosure.

The present disclosure has been described using non-limiting detailed descriptions of examples thereof that are not intended to limit the scope of the general inventive concept. It should be understood that features and/or operations described with respect to one example may be used with other examples and that not all examples have all of the features and/or operations illustrated in a particular figure or described with respect to one of the examples. Variations of examples described will occur to persons of the art. Furthermore, the terms "comprise," "include," have and their conjugates, shall mean, when used in the disclosure and/or claims, "including but not necessarily limited to."

it is noted that some of the above described examples may include structure, acts or details of structures and acts that may not be essential to the general inventive concept and which are described for illustrative purposes. Structure and acts described herein are replaceable by equivalents, which perform the same function, even if the structure or acts are different, as known in the art. Therefore, the scope of the general inventive concept is limited only by the elements and limitations as used in the claims.

What is claimed is:

1. A method of detecting an event in an image forming device, the method comprising:

transporting a substrate along a transport path of the image forming device by a substrate transport unit of the image forming device;

forming an image on the substrate by an image forming module of the image forming device;

detecting the event in the image forming device and providing an event signal along a signal path by an event sensing module of the image forming device in response to the event;

providing signal pulses different than the event signal along the signal path by a signal generation module of the image forming device;

determining a presence of the event signal and an absence of the signal pulses by a signal detection module of the image forming device;

providing at least one of a visual alert and an audio alert to a user by an alert unit of the image forming device in response to a determination of the absence of the signal pulses and moving the image forming module from a first position to a second position by a repositioning module of the image forming device in response to a determination of the presence of the event signal.

2. The method according to claim 1, wherein the detecting the event and providing an event signal further comprises:

identifying a splice connecting separate portions of the substrate by the event sensing module; and providing the event signal by the event sensing module in response to the identification of the splice.

3. The method according to claim 1, wherein the image forming module and the transport path are spaced apart from each other by a first distance in the first position and a second distance in the second position such that the second distance is greater than the first distance.

4. The method according to claim 1, further comprising:

disabling the signal pulses from being received by the signal detection module by a signal processing module of the image forming device on a disable event.

5. The method according to claim 1, wherein the providing signal pulses further comprises:

providing the signal pulses in a continuous manner by the signal generation module.

6. The method according to claim 1, further comprising:

superimposing the signal pulses on the event signal by a signal processing module of the image forming device; and providing the superimposed signal pulses and the event signal to the signal detection module by the signal processing module.

7. An image forming device, comprising:

a substrate transport unit to transport a substrate including at least one splice connecting separate portions of the substrate along a transport path;

an image forming module to form an image on the substrate;

an event sensing module to detect an event of the image forming device and provide an event signal along a signal path in response to the event;

a signal generation module to provide a stream of signal pulses different than the event signal along the signal path;

a signal detection module to determine a presence of the event signal and an absence of the stream of signal pulses;

an alert unit to provide at least one of a visual alert and an audio alert to a user in response to a determination of the absence of the stream of signal pulses; and a repositioning module to move the image forming module from a first position to a second position in response to a determination of the presence of the event signal.

8. The image forming device according to claim 7, wherein the event corresponds to identification of the at least one splice.

9. The image forming device according to claim 7, wherein the image forming module and the transport path are spaced apart from each other by a first distance in the first position and a second distance in the second position such that the second distance is greater than the first distance.

10. The image forming device according to claim 7, further comprising:

a control unit to decrease a speed of the substrate transported along the transport path in response to the determination of the presence of the event signal.

11. The image forming device according to claim 7, further comprising a signal processing module to superimpose the stream of signal pulses on the event signal and provide the superimposed stream of signal pulses and the event signal to the signal detection module.

12. The image forming device according to claim 7, further comprising:

a signal processing module to disable the stream of signal pulses from being received by the signal detection module based on a disable event.

13. A non-transitory computer-readable storage medium having computer executable instructions stored thereon to operate a printing device to detect an event therein, the instructions are executable by a processor to: transport a print substrate having at least one splice connecting separate portions of the print substrate along a transport path by a print substrate transport unit of the printing device;

form an image on the print substrate by an image forming module of the printing device;

detect the event of the printing device corresponding to a presence of the at least one splice and provide an event signal along a signal path by an event sensing module of the printing device in response to the event;

provide signal pulses different than the event signal along the signal path by a signal generation module of the printing device;

determine a presence of the event signal and an absence of the signal pulses by a signal detection module of the printing device;

provide at least one of a visual alert and an audio alert to a user by an alert unit of the printing device in response to a determination of the absence of the signal pulses; and move the image forming module from a first position to a second position by a repositioning module of the printing device in response to a determination of the presence of the event signal.

* * * * *

UNITED STATES PATENT AND TRADEMARK OFFICE

CERTIFICATE OF CORRECTION

PATENT NO. : 9,096,087 B2
APPLICATION NO. : 13/627834
DATED : August 4, 2015
INVENTOR(S) : Meados et al.

It is certified that error appears in the above-identified patent and that said Letters Patent is hereby corrected as shown below:

In the claims

Column 8, line 22 approx., Claim 11, delete “comprising” and insert -- comprising: --, therefor.

Signed and Sealed this
Twenty-fourth Day of May, 2016

Michelle K. Lee
*Director of the United States Patent and Trademark Office*